(12) United States Patent
Verlaak et al.

(10) Patent No.: US 12,312,270 B2
(45) Date of Patent: May 27, 2025

(54) CELLULAR GLASS PRODUCT AND PROCESS FOR MAKING THE SAME

(71) Applicant: PITTSBURGH CORNING EUROPE NV, Tessenderlo (BE)

(72) Inventors: Stijn Verlaak, Hasselt (BE); Barbara Aerts, Kortrijk-Dutsel (BE); Christophe Aerts, Olmen (BE); Vicky Philippe, Eksel (BE); Gisèle Claes, Beringen (BE); Damiaan Lemmens, Kontich (BE)

(73) Assignee: PITTSBURGH CORNING EUROPE NV, Tessenderlo (BE)

( * ) Notice: Subject to any disclaimer, the term of this patent is extended or adjusted under 35 U.S.C. 154(b) by 1068 days.

(21) Appl. No.: 17/055,621

(22) PCT Filed: May 15, 2019

(86) PCT No.: PCT/EP2019/062527
§ 371 (c)(1),
(2) Date: Nov. 16, 2020

(87) PCT Pub. No.: WO2019/219769
PCT Pub. Date: Nov. 21, 2019

(65) Prior Publication Data
US 2021/0221727 A1  Jul. 22, 2021

(30) Foreign Application Priority Data
May 17, 2018 (EP) ..................................... 18172855

(51) Int. Cl.
C03C 11/00 (2006.01)
C03B 19/08 (2006.01)
C03B 25/04 (2006.01)

(52) U.S. Cl.
CPC ............ C03C 11/007 (2013.01); C03B 19/08 (2013.01); C03B 25/04 (2013.01)

(58) Field of Classification Search
CPC .................................................. C03C 11/007
See application file for complete search history.

(56) References Cited

U.S. PATENT DOCUMENTS

| | | | |
|---|---|---|---|
| 4,347,326 A | 8/1982 | Iwami et al. | |
| 5,516,351 A | 5/1996 | Solomon et al. | |
| 8,465,814 B2 | 6/2013 | Wang | |
| 2005/0031844 A1 | 2/2005 | Wang | |

FOREIGN PATENT DOCUMENTS

| | | |
|---|---|---|
| CN | 1194629 A | 9/1998 |
| CN | 1549797 A | 11/2004 |
| CN | 1559947 A | 1/2005 |
| CN | 1805783 A | 7/2006 |
| CN | 101531462 A | 9/2009 |
| CN | 101602574 A | 12/2009 |
| CN | 102099305 A | 6/2011 |
| CN | 103833229 A | 6/2014 |
| CN | 104030572 A | 9/2014 |
| CN | 105585250 A | 5/2016 |
| FR | 1303256 A | 9/1962 |
| JP | 2004067400 A | 3/2004 |
| JP | 2004300025 A | 10/2004 |
| RU | 2490219 C1 | 8/2013 |
| WO | 8000078 A1 | 1/1980 |
| WO | 9736835 A1 | 10/1997 |
| WO | 2009141456 A1 | 11/2009 |

OTHER PUBLICATIONS

Shelby,JE, Introduction to Glass Science and Technology, 2005, Royal Society of Chemistry, 2nd Ed, pp. i-xvi and 262-291 (Year: 2005).*
Office Action from EP Application No. 19724485.8 dated Jul. 27, 2023.
Extended European Search Report from EP Application No. 18172855.1 dated Nov. 19, 2018.
International Search Report and Written Opinion from PCT Application No. PCT/EP2019/062527 dated Aug. 14, 2019.
Huo et al., "A novel fabrication method for glass foams with small pore size and controllable pore structure," Journal of the American Ceramic Society 100 (2017) pp. 5502-5511.
Konig et al., "Influence of the glass particle size on the foaming process and physical characteristics of foam glass," Journal of Non-Crystalline Solids 447 (2016) pp. 190-197.
Office Action from RU Application No. 2020141414 dated Dec. 3, 2021.
Office Action from CN Application No. 2019800329895 dated May 9, 2022.
Office Action and Search Report from RU Application No. 2020141414 dated Jul. 6, 2021.
Supplementary Search Report from CN Application No. 2019800329895 dated Oct. 14, 2022.

\* cited by examiner

*Primary Examiner* — Elizabeth A. Bolden
(74) *Attorney, Agent, or Firm* — Calfee, Halter & Griswold LLP (57) ABSTRACT

Disclosed is a cellular glass product having a density D at ambient temperature of at most 200 kg/m³ and a process for the production of a cellular glass product having a density D at ambient temperature of at most 200 kg/m³. The process comprises the N steps of: a) contacting glass powder with foaming agent to form a dry mixture, b) thermally treating the mixture in a foaming furnace, thereby forming cellular glass, and c) annealing the cellular glass of step b) in an annealing lehr, wherein the concentration of at least one of the reagents in the dry mixture of step a) that are necessary for enabling the foaming reaction is at least 150% of the concentration N corresponding to the theoretical minimum requirement for obtaining the density D.

6 Claims, 1 Drawing Sheet

CELLULAR GLASS PRODUCT AND PROCESS FOR MAKING THE SAME

CROSS-REFERENCE TO RELATED APPLICATIONS

This application is the U.S. national stage entry of International Application No. PCT/EP2019/062527, filed May 15, 2019, which claims priority to and the benefit of European Application No. 18172855.1, filed May 17, 2018, the entire contents of which are incorporated by reference herein.

FIELD OF THE INVENTION

The present invention relates to cellular glass products and a process of making cellular glass products and particularly, although not exclusively, to cellular glass products made from glass and one of more foaming reagents whereby foaming gas is formed in a higher supersaturated state.

BACKGROUND

Glass is an inorganic product of fusion that has cooled to a rigid condition without crystallizing (ASTM C-162). The most common glasses are silicate glasses. The basic structural unit of silicate glasses is the silicon-oxygen tetrahedron in which a silicon atom is tetrahedrally coordinated to four surrounding oxygen atoms. Similar to the crystalline silicates, the $SiO_4$ tetrahedra in the silicate glasses are found in a variety of configurations depending on the oxygen-to-silicon ratio in the glass compositions.

Some glasses are naturally occurring, such as perlite, pumice, obsidian, pitchstone, and volcanic ash. Others, such as soda-lime glasses, are produced synthetically. For example, soda-lime glass may be made by melting batches of raw materials containing the oxides of silicon (i.e., $SiO_2$), aluminium (i.e., $Al_2O_3$), calcium (i.e., CaO), sodium (i.e., $Na_2O$), and sometimes potassium (i.e., $K_2O$) or lithium (i.e., $Li_2O$), or other compounds which may convert to the oxide, such as $Na_2CO_3$, or $Na_2SO_4$, together in a furnace, and then allowing the melt to cool so as to produce the amorphous product. Glasses may be made in a wide variety of shapes, including sheets or plates, cast shapes, or fibres. Mineral wools, rock wools, and silicate cottons are generic names for manufactured fibres in which the fibre-forming substances may be slag, certain rocks, or glass.

Cellular glasses (sometimes referred to as foam glasses) are a special class of lightweight glass materials having a large number of small gas-containing glass cells. The cells may be completely sealed or may be open. The process of making foam glasses has been developed over many years and the most common technique of making foam glasses consists of following steps: 1) melting of glass raw material at high temperature to form a base glass, 2) grinding the base glass with additional foaming agents, 3) foaming of the ground glass powder at high temperature. The base glass composition may be similar to this of regular window glass, which typically contains 70-73% $SiO_2$, 1-3% $Al_2O_3$, 0.1-0.5% $Fe_2O_3$, 13-15% $Na_2O$, 0-2% $K_2O$, 5-7% CaO and 3-5% MgO (by weight). The foaming agents are normally carbon black and/or alkali carbonates. Carbon black may combine with free oxygen to form CO and/or $CO_2$ gas to foam the glass.

Cellular glass products are used primarily as insulating materials, and especially when other properties such as compressive strength, rigidity, dimensional stability, non-flammability or fire resistance, chemical inertness, water and/or water vapour proofing, water/steam resistance, insect/rodent resistance and/or other barrier properties or resistances are of importance.

The prime purpose of cellular glass is to bring thermal insulation, yet often in combination with mechanical strength. The most important property of cellular glass is therefore its thermal conductivity, its "lambda" ($\lambda$). The lambda is linearly related to the density of the ultimate cellular glass product. As the density reduces, the amount of glass available to conduct the heat reduces, and the lambda reduces and hence improves.

The density of the ultimate cellular glass product may be reduced by foaming longer and/or at a higher temperature in the foaming furnace. A longer or hotter foaming step leads to larger cells, and hence to a lower density. There is however a downside. Extending the residence time and/or increasing the temperature in the foaming step will usually at some point exhaust the reagents of the foaming reaction. From that moment onwards, the cells will no longer be able to grow by the contribution of the reactants of the foaming reaction. Instead, the only remaining driver for cell change is to coalesce, typically combined with viscous draining of the cell wall material. Cells will thereby grow in size and may at the same time also thicken their cell walls without decreasing the density of the overall product. As the density reduces and cells grow larger, also the mechanical properties deteriorate, such as the compressive strength and the point load resistance. As the cells grow, mechanical loads will be distributed over fewer cell walls, which will become more prone to fracture, in spite of their possibly increased thickness. Also, at a certain point in this process, the foam integrity becomes lost once the cells will have coalesced too much.

In general, the cellular glass production process may readily be controlled to obtain a product having a target density D, albeit within certain limits. By controlling the residence time of the dry glass and foaming agent mixture and the temperature profile in the foaming furnace, the operator is capable of setting the density D of the final product when the latter has been cooled down to ambient temperature, as long as sufficient amounts of the necessary foaming reagents remain available. Residence time and temperature profile are thus necessary but insufficient conditions to reach a target density D. There also needs to be enough reagents to sustain the foaming reaction until the target density can be reached. In other words, a target density can only be achieved if there are sufficient reagents to provide enough foam for the given target density.

Conventional cellular glass products represent a compromise between a product with low density to afford good thermal insulation properties (lambda) and maintaining good mechanical properties. Specifically, higher density products may give good mechanical properties, but the thermal insulating properties is usually inadequate for many end-use applications, hence such products have little to no commercial interest. On the other hand, when the density is reduced to improve the thermal properties, the average cell diameter increases to about 2 mm and above. In this case, the mechanical properties quickly become unacceptably poor.

The operating window of commercially useful cellular glass products is therefore currently restricted roughly to the density range of 95-220 kg/m³, with the bulk of the commercial products having a density in the range of 100-130 kg/m³. The applicants have found that the currently available technologies for producing cellular glass are unable to provide products having a density of 90 kg/m³ or lower while maintaining acceptable mechanical properties.

Specific examples of the manufacture of cellular glass include those described in US 2005/0031844 A1 and WO 2009/141456 A1. US 2005/0031844 A1 describes a dry process wherein fine perlite ore is mixed in varying ratios with foaming agents selected from soda ash, calcium carbonate and carbon black.

The mixture is milled in a stall steel ball mill for 30 minutes. The milled mixture is placed in a crucible, foamed by melting the mixture at 1125° C. in an electrical furnace and annealed in a separate furnace. The products have a thermal conductivity of at least 0.069 W/mK at 23° C. combined with a density of at least 145 kg/m³.

WO 2009/141456 A1 describes a continuous process for producing cellular ceramic plates with asymmetrical cell structure using a foaming furnace including a first conveyor, an intermediate zone including an intermediate (third) conveyor and an annealing lehr including a second conveyor. The process leads to foam-glass plates with elongated cells. The example reports products having a density of 105 kg/m³ with stretching of the cells of 5, 10 and 15% respectively. The compressive strengths obtained were respectively 0.9, 0.77 and 0.7 N/mm², and the k-values respectively 0.0415, 0.0413 and 0.0408 W/mK. The gain in reduced k-value was thus accompanied by a simultaneous decrease in compressive strength. Improved mechanical properties were reportedly obtained with stretching a product having a density of 120 kg/m³ for 20%. Another product having a density of 115 kg/m³ and a k-value of 0.042 W/mK is reported. WO 2009/141456 A1 does not provide any details about the composition of the glass powder and about the foaming agent which are used in the examples.

There therefore remains a need for a cellular glass product that provides better thermal insulation properties and/or better mechanical properties relative to the current capabilities in the art. The need exists for improved mechanical properties for the same thermal insulation property, or for improved thermal insulation properties for the same mechanical properties, or for a simultaneous improvement of both.

The present invention has been devised in light of the above considerations.

SUMMARY OF THE INVENTION

The present inventors have surprisingly found that forming a cellular glass product by a process where the foaming gas is present at a higher supersaturated level (e.g. in excess amounts than required for the volume of gas in the final product), the cellular glass products have smaller than expected average cell diameter for a given density of the final cellular glass product. As a result, the final cellular glass products have better than expected mechanical properties at any given product density when compared to conventional products at the same density. Conversely, such process allows stable cellular glass products to be produced at a density of 90 kg/m³ and lower.

According to a first aspect, the present invention provides a process for the production of a cellular glass product having a density D at ambient temperature of at most 200 kg/m³, the process comprising the steps of:
a) contacting a glass powder with a foaming agent powder to form a dry mixture comprising glass particles and foaming agent particles admixed,
b) thermally treating the mixture from step a) in a foaming furnace, thereby forming cellular glass, and
c) annealing the cellular glass of step b) in an annealing lehr by cooling the cellular glass,
wherein the concentration of at least one of the reagents in the dry mixture of step a) that are necessary for enabling the foaming reaction is at least 150% of the concentration corresponding to the theoretical minimum requirement for obtaining the density D in the cellular glass product at ambient temperature after its cooling in step c).

The present inventors have measured the average cell diameter of known high quality cellular products at a range of densities of interest to the present invention. The relationship may be given by the formula:

$$d = \frac{C_a}{\sqrt[3]{\dfrac{1}{1 - \dfrac{D}{B}} - (1 + C_b)}} \qquad (I)$$

wherein:
d is the average cell diameter, expressed in meters
D is the density of the cellular glass product, expressed in kg/m³,
B is the density of the bulk solid glass material forming the cell walls of the cellular glass product, expressed in kg/m³, usually 2515 kg/m³,
$C_a$ is first constant=5.96×10⁻⁶, and
$C_b$ is a second constant=9.51×10⁻³.

In formula I, the densities are given at ambient temperatures. This relationship is plotted in the FIGURE.

The present inventors have found that by increasing the amount of one or more of the reagents that are necessary for enabling the foaming reaction above the theoretical minimum required for that reagent, then a higher number of smaller cells can be formed at any given density of cellular product.

Without being bound by theory, the inventors believe that a greater density of foaming reactions may be created when at least one of the reagents for the foaming reaction is present in excess to the minimum theoretical requirement. This effect may be increased when all of the reagents for the foaming reaction are present in excess. In this way, it is believed that there are more nucleating sites in the dry mixture of step a) once the glass powder particles have started sintering and building a viscous continuous phase. As such, the foaming process may produce a larger number of smaller cells. It may also result in nucleation continuing to occur even while the foaming is ongoing, leading to an even larger number of smaller cells.

The present inventors have found that cellular products composed of a large number of small cells have improved mechanical properties at any given density compared to conventional cellular glass products. Put another way, the cellular glass products made using the process of the first aspect may have similar mechanical properties to conventional cellular products but with a lower density. As the thermal properties of cellular glass properties increase linearly with a decrease in the density of cellular glass products, similar mechanical properties can be provided with better thermal insulation properties (lambda) while also reducing the amount of glass used.

According to a second aspect, the present invention provides a cellular glass product produced from the process of the first aspect.

According to a third aspect, the present invention provides a cellular glass product having a density D at ambient temperature of 90 kg/m³ or lower. The process of the first aspect may allow usable cellular glass products with a density at ambient temperature of 90 kg/m³. Such cellular glass products are less dense than conventional cellular glass products and therefore may possess superior thermal insulation properties (e.g. improved lambda), while providing acceptable mechanical properties for commercial use.

According to a fourth aspect, the present invention provides a cellular glass product having a density D at ambient temperature of at most 200 kg/m³ and wherein the cellular glass product has an average cell diameter $d_c$ of at most 97% of a reference cell diameter, d, whereby $$d = \frac{C_a}{\sqrt[3]{\frac{1}{1-\frac{D}{B}} - (1+C_b)}} \quad (I)$$

wherein:
- d is the reference average cell diameter, expressed in meters (m),
- D is the density of the cellular glass product, expressed in kg/m³, at ambient temperature,
- B is the density of the bulk solid glass material forming the cell walls of the cellular glass product, expressed in kg/m³, at ambient temperature
- $C_a = 5.96 \times 10^{-6}$, and
- $C_b = 9.51 \times 10^{-3}$ provided that when the density D is in the range of 95 to 105 kg/m³, the average cell diameter $d_c$ is at most 90% of d.

The process of the first aspect may allow cellular glass products within the commercially useful density ranges that have relatively small cell diameter for the given density. In this way, the cellular glass products may exhibit superior mechanical properties at a given density compared to known cellular glass products. For cellular glass products with a density D in the range of 95 to 105 kg/m³, the average cell diameter $d_c$ is at most 90% of d. The bulk solid density of the glass material B is known or can be measured. In some embodiments, B is around 2515 kg/m³.

According to the third and fourth aspects together, the present invention provides a cellular glass product having a density of at most 200 kg/m³, provided that when the cellular glass product has a density D in the range of 90 kg/m³ to less than 95 kg/m³ or more than 105 kg/m³ to 200 kg/m³, the cellular glass product has an average cell diameter, $d_c$, that is at most 97% of the reference cell diameter, d, and provided that when the cellular glass product has a density D in the range of 95 kg/m³ to 105 kg/m³, the cellular glass product average cell diameter $d_c$ is at most 90% of d; whereby $$d = \frac{C_a}{\sqrt[3]{\frac{1}{1-\frac{D}{B}} - (1+C_b)}}$$

wherein:
- d is the reference average cell diameter, expressed in meters (m),
- D is the density of the cellular glass product, expressed in kg/m³, at ambient temperature,
- B is the density of the bulk solid glass material forming the cell walls of the cellular glass product, expressed in kg/m³, at ambient temperature
- $C_a = 5.96 \times 10^{-6}$, and
- $C_b = 9.51 \times 10^{-3}$.

In particular embodiments, the cellular glass product of this aspect has a density D of at least 70 kg/m³.

In particular embodiments, the cellular glass product of the third or fourth aspects has a point has a compressive strength of at least 400 kPa (0.4 N/mm²). Additionally or in alternative embodiments, the cellular glass shows a deformation under a point load of 1000 N, $P_d$, of at most 2.0 mm as determined in accordance with European Standard EN 12430.

The invention includes the combination of the aspects and features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Figure 1:
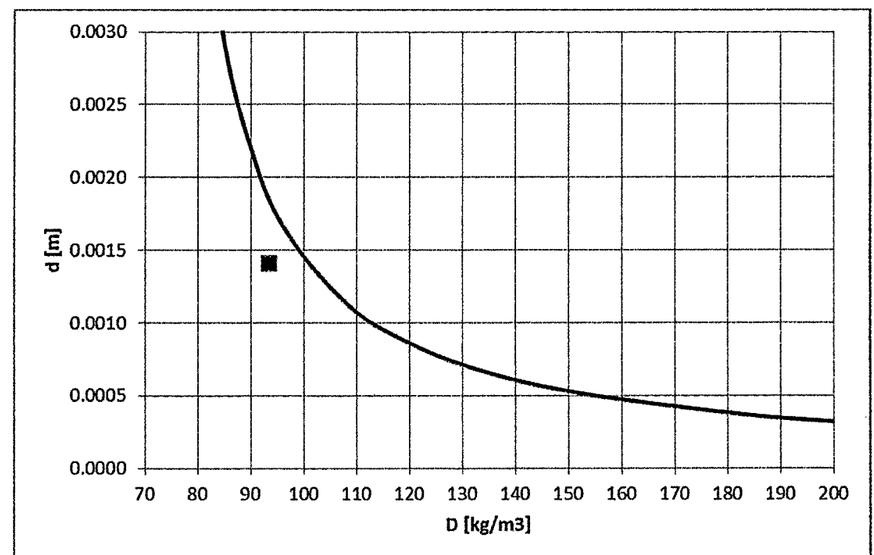
The FIGURE shows a plot of the relationship between average cell diameter in a cellular glass product and the density of the cellular glass product as modelled from high quality known cellular glass products.

Aspects and embodiments of the present invention will now be discussed with reference to the accompanying figures. Further aspects and embodiments will be apparent to those skilled in the art. All documents mentioned in this text are incorporated herein by reference.

All densities of bulk solid glass material or cellular glass products are given in kg/m³ and measured at ambient temperature, unless specified otherwise. All percentages are given in weight percentages unless specified otherwise. The term "at least" an amount is to be interpreted as including that amount as a lower limit (i.e. an amount or higher). The term "at most" an amount is to be interpreted as including that amount as an upper limit (i.e. an amount or lower). Any range includes the end-points as specific disclosures.

Thermally Treating the Dry Mixture of Step a)

The process of the present invention thermally treats a mixture of glass powder and foaming agent powder in a foaming furnace to form a cellular glass product in step b of the process of the present invention.

Without wishing to be bound by theory, the foaming reaction in the production of cellular glass products typically involves melting of a glass composition and the reaction of one or more foaming reagents to form a gas within the molten glass. The gas may be therefore create cells within the glass and forms the cellular glass product on cooling.

Theoretical Minimum Requirement for Obtaining Density D in the Cellular Glass Product The process of the present invention requires that one of the reagents for enabling the foaming reaction (also referred to as a foaming reagent) is present in at least 150% of the concentration corresponding to the theoretical minimum requirement for obtaining density D in the cellular glass product. In other words, the process of the present invention requires that one or more of the foaming reagents is present in 150% or more of the concentration corresponding to the theoretical minimum requirement for obtaining density D in the cellular glass product.

The theoretical minimum requirement for obtaining density D in the cellular glass product may be calculated by the skilled person with reasonable accuracy. In very general terms, the theoretical minimum requirement of a foaming reagent will be the minimum foaming reagent required to reduce the bulk density of the solid glass to the required density of the cellular glass product. The theoretical minimum will therefore depend on various factors such as the bulk density of the solid glass, the desired density of the final cellular glass product and the nature of the foaming reagent.

The theoretical minimum number of moles of gas ($n_{cell}$) to create the target density, D (kg/m$^3$), at ambient temperature of the cellular glass product can be calculated as follows.

As used herein, unless the context indicates otherwise, ambient temperature takes its normal meaning, namely the temperature of the surrounding environment. Ambient temperature typically does not involve intentional heating or cooling. Ambient temperature may be in the range of 20° C.±10° C.

The cellular glass production process is characterised by a shrinkage fraction S, which is the relative height loss of the foam when the foam cools from the peak foaming temperature in the foaming furnace, "$T_{foaming}$", down to ambient temperature. A 100 mm thick foam at $T_{foaming}$ shrinking to 85 mm as the foam cools, would have a shrinkage factor S=0.15. Most of the shrinking has occurred when the temperature at the surface of the product has reduced to below about 350° C., and thus significantly before the product leaves the production process at the end of the annealing lehr.

This shrinkage fraction is usually in the range of 0.15-0.25 and well known to the operator for each foaming processes.

In order to obtain a density D (kg/m$^3$) at ambient temperature, the foam should have a density $D_f$ (kg/m$^3$) at $T_{foaming}$, whereby $$D_f = D*(1-S)$$

In order to achieve the density $D_f$, the foamed product needs, at $T_{foaming}$, a cell volume $V_{cell}$ for each 1 m$^3$ of product volume or for each amount of $D_f$ product weight, whereby $$V_{cell} = 1 - (D_f/D_{bulk\ glass})$$

$D_{bulk\ glass}$ is the bulk solid glass density, a parameter which is also well known to the operator, and for glass typically around 2515 kg/m$^3$.

The volume of cell gasses ($V_{cell}$) for a particular weight or volume of cellular glass may be converted into an amount of cell gasses $n_{cell}$ expressed in moles which is required for achieving the product density $D_f$ at the peak foaming temperature:

$$n_{cell} = P_{cell}*V_{cell}/(R*T_{foaming})$$

wherein
R is the universal gas constant (8.314 J/mol·K)
$P_{cell}$ is the cell pressure at the peak foaming temperature. This may be taken as atmospheric pressure (101,300 Pa). Any increasing effects by hydrostatic pressure, surface tension and viscous resistance to inflation can be taken into account as well, but are small.
$T_{foaming}$ is the peak foaming temperature, expressed in degrees Kelvin Knowing the chemical reactions that lead to the generation of the gasses that are responsible for the foaming, this amount of cell gas may be converted to concentration(s) of the reagent(s) for the foaming reaction that need(s) to be built into the powder entering the foaming furnace.

Foaming Reagents

Various foaming reagents are known for the production of cellular glass products. Particularly useful foaming reagents to be used in the dry mixture of step a) of the process of the present invention are foaming reagents that produce $CO_2$ as a gas when heated.

In some embodiments, the dry mixture of step a) includes a single foaming reagent as the sole foaming agent. Examples of single foaming reagents include alkali metal carbonates such as potassium carbonate. In these embodiments, the foaming agent particles typically comprise the sole foaming agent. In these embodiments, the dry mixture of step a) may include additional components that can act as foaming reagents in different circumstances but do not contribute significantly to the foaming reaction.

The dry mixture of step a) may include two or more foaming reagents. In these embodiments, the dry mixture of step a) may include a first foaming reagent, the first foaming agent being a source of carbon capable of being oxidised and a second foaming reagent, the second foaming agent being a source of oxygen capable of oxidising the carbon in the first foaming agent. In particular embodiments, the dry mixture of step a) includes carbon black and a source of free oxygen, such as sulphate When the dry mixture of step a) includes two or more foaming reagents, one, two or all of the foaming reagents may be present in the foaming agent powder. Additionally or alternatively, one or more of the foaming reagents may be present in the glass powder particles. In particular embodiments, at least one foaming agent is present in the foaming agent powder and at least one foaming reagent is present in the glass powder particles.

In a particular embodiment, the foaming agent powder includes a first foaming reagent, the first foaming agent being a source of carbon capable of being oxidised and the glass powder particles include a second foaming reagent, the second foaming agent being a source of oxygen capable of oxidising the carbon in the first foaming agent. In a more particular embodiment, the foaming agent powder includes a carbon black and the glass powder particles include a source of free oxygen, such as sulphate The theoretical minimum amount of one or more foaming reagents can be calculated from the $n_{cell}$ calculated above and from the type of foaming reagent used.

A simple foaming system to use is alkali carbonate as the foaming reagent. An appropriate amount of e.g. potassium carbonate powder, $K_2CO_3$, may be used as the foaming agent powder and mixed into the glass powder that is fed to the foaming furnace. At the temperatures in the foaming furnace, the potassium carbonate decomposes and each molecule of carbonate is able to release one molecule of carbon dioxide ($CO_2$). The liberated carbon dioxide is then responsible for the foaming of the product in the furnace.

In this foaming system, one mole of $CO_2$ thus requires one mole of $K_2CO_3$, or 138 grams of potassium carbonate. The minimum theoretical amount of potassium carbonate $P_{CThmin}$ required for obtaining the desired product density $D_f$ expressed as grams of potassium carbonate per kg of powder mixture that is entering the foaming furnace may thus be calculated as $$P_{CThmin} = 138.2*n_{cell}/(1000*D_f)$$

Or in function of the ultimate target product density D:

$$P_{CThmin}=138.2*n_{cell}*(1-S)/(1000*D)$$

For obtaining a cellular glass product having a density D at ambient temperature of 125 kg/m³, with a process having a shrinking fraction S of 0.20, one will need a density at foaming temperature $D_f$ of 125*(1-0.20)=100 kg/m³. With the glass having a bulk density of 2515 kg/m³, the required cell volume in 1 m³ of foamed product at foaming conditions is thus 0.960 m³.

The amount of $CO_2$ that needs to be liberated is thus 101300*0.960/(8.314*1050)=11.14 moles. This requires 11.14 moles of potassium carbonate, or 1540 grams. Relative to the 100 kg mass of glass and foaming agent present in the 100 kg per 1 m³ of product under foaming conditions, this represents a theoretical minimum concentration of potassium carbonate required in the glass and foaming agent powder of 1.54% wt.

An alternative foaming agent is based on carbon black, in a powder form, which reacts with oxygen which is chemically bound in the glass powder but which may be released under the conditions in the foaming furnace. The chemical reactions may be written as follows:

$$C+O \rightarrow CO \quad \text{(II)}$$

$$CO+O \rightarrow CO_2 \quad \text{(III)}$$

Or together as one single reaction $$C+2O \rightarrow CO_2 \quad \text{(IV)}$$

One mole of $CO_2$ thus requires one mole of carbon source, or 12 grams of carbon. The minimum theoretical amount of carbon $C_{BThmin}$ required for obtaining the desired product density $D_f$, expressed as grams of carbon per kg of powder mixture that is entering the foaming furnace may thus be calculated as $$C_{BThmin}=12*n_{cell}/(1000*D_f)$$

Or in function of the ultimate target product density D:

$$C_{BThmin}=12*n_{cell}*(1-S)/(1000*D)$$

Because one mole of $CO_2$ requires two moles of available oxygen, the theoretically minimum required amount of available oxygen for obtaining the desired product density $D_f$, expressed as grams of freeable or available oxygen per kg of powder mixture that is entering the foaming furnace may thus be calculated as $$FFO_{Thmin}=32*n_{cell}/(1000*D_f)$$

Or in function of the ultimate target product density D $$FFO_{Thmin}=32*n_{cell}*(1-S)/(1000*D)$$

In some embodiments, the source of free or available oxygen is sulphate. Such source of free oxygen may be dissolved in or be a component of the glass powder.

In the context of the present invention, "free oxygen" is defined as the oxygen that is part of the glass material and that is able to become available for the foaming reaction under the conditions in the foaming furnace. The free oxygen content of the mixture may readily be calculated from its chemical composition, i.e. from the content of the various possible donors of free oxygen in the mixture, in combination with the amount of free oxygen which the individual donors are able to liberate.

The general formula is formula (VI):

$$Ox = 10*MW_O*\left(\frac{N_1*C_1}{MW_1} + \frac{N_2*C_2}{MW_2} + \frac{N_3*C_3}{MW_3} + ... + \frac{N_n*C_n}{MW_n}\right) \quad \text{(VI)}$$

wherein:
Ox is the amount of free oxygen atoms available in the mixture, in grams of oxygen per kg of glass,
$MW_O$ is the molecular weight of atomic Oxygen (approximately 16),
$C_i$ (i=1–n) is the wt % of component i in the mixture,
$N_i$ (i=1–n) is the number or free oxygen atoms one molecule of component i is able to liberate or contribute to the free oxygen content,
$MW_i$ (i=1–n) is the molecular weight of component i, and
n is the number of components capable of contributing to the free oxygen content of the mixture.

It is assumed above that all sulphur is present as $SO_4^{2+}$ also in the glass material, and thus is able to contribute 4 oxygen atoms per molecule. This assumption is justified by the observation that the chemical solubility of an ion ($SO_4^{2+}$) in a glass melt is typically three orders of magnitude higher than the physical solubility of the corresponding neutral molecule (i.e. $SO_3$).

Excess of Foaming Reagent(s)

The process of the present invention requires that one of the reagents for enabling the foaming reaction (foaming reagent) is present in at least 150% of the concentration corresponding to the theoretical minimum requirement for obtaining density D in the cellular glass product. The provision of at least one of the foaming reagents in such an excess provides the formation of an excess of gas to form a higher supersaturated state. In other words, the gas is present in a supersaturated state that is more saturated than typically required to form cellular glass. It is believed that such a higher level of supersaturation leads to the nucleation of a large number of small cells.

In a particular embodiment, all of the reagents for enabling the foaming reaction (foaming reagents) are present in at least 150% of the concentration corresponding to the theoretical minimum requirement for obtaining density D in the cellular glass product. This feature brings the advantage that all the chemicals for the foaming reaction more readily find their necessary counterpart and start the foaming reaction. This brings the advantage that there are more nucleating sites in the dry mixture of step a) once the glass powder particles have started sintering and have started building a viscous continuous phase. This means that the foaming produces even more and thus even smaller cells. It also means that nucleation continues to occur even while the foaming is ongoing, again leading to more and smaller cells. This brings the advantage that the beneficial technical effects obtained by the present invention are even more enhanced.

In some embodiments the foaming reagents include a source of carbon and a source of free oxygen, and wherein both the source of carbon and the source of free oxygen are present in the dry mixture of step a) in at least 150% of the concentration corresponding to the theoretical minimum for obtaining density D in the cellular glass product.

In a particular embodiment of the process according to the present invention, the lower limit for the foaming reagent concentration is at least 155% of the concentration corresponding to the theoretical minimum requirement for obtaining the density D in the product after cooling to ambient temperature.

In particular embodiments, the foaming reagent concentration is at least 160%, at least 165%, at least 170%, at least 180%, at least 190%, at least 200%, at least 210%, at least 220%, at least 230%, at least 240%, at least 250%, at least 260%, at least 270%, at least 280%, at least 290%, at least 300%, at least 310%, at least 320%, at least 330%, at least 340%, or at least 350% of the concentration corresponding to the minimum theoretical requirement for obtaining the density D in the product after its cooling to ambient temperature.

In an embodiment of the process according to the present invention, the foaming reagent concentration is at most 500% of the concentration corresponding to the theoretical minimum requirement for obtaining the density D in the product after cooling to ambient temperature. In particular embodiments, the foaming reagent concentration is at most 475%, at most 450%, at most 425%, at most 400%, at most 375%, at most 350%, at most 325%, at most 300%, at most 275%, or at most 250% of the concentration corresponding to the minimum theoretical requirement for obtaining the density D in the product after its cooling to ambient temperature. In more particular embodiments, the foaming reagent is in the range of 150% to 500%, 160% to 400%, 170% to 350%, 180% to 300%, or 200% to 250% of the concentration corresponding to the minimum theoretical requirement for obtaining the density D in the product after its cooling to ambient temperature.

In some circumstances, the applicants have found that there is no need to increase the excess foaming reagent above the theoretical minimum requirement beyond a certain upper limit as specified in order to obtain the desired effect. The applicants have found that any additional benefits gained by further increasing the foaming reagent concentration beyond this point are small or insignificant when compared to any additional burden of increasing the concentration further.

Foaming Agent Powder

In an embodiment of the process according to the present invention, the foaming agent powder is present in the dry mixture of step a) being fed to the foaming furnace at a concentration of at least 0.20% wt, at least 0.25% wt, at least 0.30% wt, at least 0.35% wt, at least 0.40% wt, at least 0.45% wt, at least 0.50% wt, at least 0.55% wt, at least 0.60% wt, at least 0.65% wt, at least 0.70% wt, at least 0.75% wt, at least 0.80% wt, at least 0.85% wt, at least 0.90% wt, at least 0.95% wt, at least 1.00% wt, at least 1.05% wt, or at least 1.10% wt based on the total weight of the dry mixture of step a).

In some embodiments, the foaming agent powder is present in the dry mixture of step a) at a concentration of at most 1.5% wt, at most 1.4% wt, at most 1.3% wt, at most 1.20% wt, at most 1.15% wt, at most 1.10% wt, at most 1.05% wt, at most 1.00% wt, at most 0.90% wt, at most 0.80% wt, at most 0.75% wt, at most 0.70% wt, at most 0.65% wt, at most 0.60% wt, at most 0.55% wt, at most 0.50% wt, at most 0.45% wt, at most 0.40% wt based on the total weight of the dry mixture of step a).

In particular embodiments, the foaming agent powder is present in the dry mixture of step a) at a concentration in the range of 0.20% wt to 1.5% wt based on the total weight of the dry mixture of step a). In more particular embodiments, the foaming agent powder is present in the dry mixture of step a) at a concentration in the range of 0.25% wt to 1.0% wt based on the total weight of the dry mixture of step a). In yet more particular embodiments, the foaming agent powder is present in the dry mixture of step a) at a concentration in the range of 0.30% wt to 0.75% wt based on the total weight of the dry mixture of step a).

In an embodiment of the process according to the present invention, the foaming agent powder is selected from the list consisting of carbonates, sulphates, silicon carbide, iron disulphide and carbon based powders.

In particular embodiments, the foaming agent powder is selected from the list consisting of calcium carbonate, lithium carbonate and/or magnesium carbonate, sodium sulphate and/or aluminium sulphate, powders based on glassy carbon, coal or diamond, including carbon black powder. Particularly suitable carbonates are calcium carbonate, potassium carbonate, lithium carbonate and/or magnesium carbonate. Particularly suitable sulphates are sodium sulphate and/or aluminium sulphate. Particularly suitable carbon based powders are powders based on glassy carbon, coal or diamond, including carbon black powder.

In a particular embodiment of the process according to the present invention, the foaming agent powder is carbon black powder. The applicants have found that carbon black powders are readily available in the desired qualities from various sources and suppliers at economically acceptable conditions. Carbon black powders have the advantage of being of high purity in terms of carbon content.

Carbon black powders also do not introduce significant amounts of other atoms into the mixture. Carbon black powders suitable as foaming agents are for instance types N115, N121, N134, N220, N231, N234, N299, N326, N330, N339, N343, N347, N351, N375, N539, N550, N630, N650, N660, N683, N762, N765, N772, N774 and N990, obtainable from the companies Birla Carbon under the tradename STATEX®, or from Orion Engineered Carbons, Philips Carbon black or Omsk Carbon group Other suitable carbon black powders are available as Printex 75, Printex U, Printex 95, obtainable from the company Orion Engineered Carbons, and Raven®7000, Raven®5000 Ultra® II, Raven®5000 Ultra® III, Raven®3500, Raven®2500 Ultra®, Raven®2300 Ultra®, Raven®2000, Raven®1255, Raven®1250, Raven®1220 Ultra®, Raven®1200, Raven®1190 Ultra®, Raven®1180, Raven®1170, Raven®1100 Ultra®, Raven®1080 Ultra®, Raven®1060 Ultra®, Raven®1040, Raven®1035, Raven®1030, Raven®1020, Raven®1000, Raven®900, Raven®890, Raven®880 Ultra®, Raven®880, Raven®790 Ultra®, Raven®780 Ultra®, Raven®760 Ultra®, Raven®520, Raven®520 Ultra®, Raven®510 Ultra®, Raven®500, Raven®460, Raven®450, Raven®430 Ultra®, Raven®425, Raven®420, Raven®410, Raven®410 Ultra®, Raven®415, Raven®22, Raven®16, Raven®14, Raven® UV Ultra®, Raven® P, Raven® PFEB, Raven® P5 Ultra®, Raven® P5, Raven® L Ultra® and Raven® L, also obtainable from the company Birla Carbon.

Glass Powder

In an embodiment of the process according to the present invention, the glass powder has a specific surface area as measured by laser diffraction in the range of 5000 $cm^2/g$ to 20000 $cm^2/g$, particularly at least 6000 $cm^2/g$.

In an embodiment of the process according to the present invention, the glass powder has a free oxygen content of at least 3.0 grams of oxygen atoms (O) per kg glass powder. In particular embodiments, the free oxygen content of the glass powder entering the foaming furnace is at least 3.5 g/kg, at least 4 g/kg, at least 4.5 g/kg, at least 5.0 g/kg, at least 5.5 g/kg, at least 6 g/kg, at least 6.5 g/kg, at least 7 g/kg, at least 7.5 g/kg, at least 8 g/kg, at least 8.5 g/kg, at least 9 g/kg, at least 9.5 g/kg, at least 10.0 g/kg, at least 10.5 g/kg, at least 11.0 g/kg. In some embodiments, the free oxygen content of the glass powder is at most 12 g/kg, at most 11 g/kg, at most 10 g/kg, at most 9.0 g/kg, at most 8.0 g/kg, at most 7.5 g/kg, at most 7.0 g/kg, at most 6.5 g/kg of glass powder.

In more particular embodiments, the glass powder has a free oxygen content in the range of 3.0 to 12 grams of oxygen atoms (O) per kg of glass powder. In further embodiments, the glass powder has a free oxygen content in the range of 4.0 to 10 grams of oxygen atoms (O) per kg of glass powder.

In this context, "free oxygen" and the content thereof are defined as explained above in this document.

The applicants have found that a higher free oxygen content of the mixture entering the foaming furnace strongly contributes to the foaming or inflating capacity of the mixture. The applicants believe, without wanting to be bound to this theory, that it is primarily, and for all practical purposes only, the free oxygen content in the mixture which is readily available for oxidizing and hence activating many of the foaming agents used in the industry producing cellular glass. The applicants have therefore found that the mixture entering the foaming furnace should particularly contain a free oxygen content in line with the above minimum level specifications.

The applicants have further found that it becomes more and more difficult, technically and economically, to further increase the free oxygen content of the dry mixture of step a) as the free oxygen content itself increases. The applicants therefore tend to respect the upper limits specified above.

Peak Foaming Temperature

In an embodiment of the process according to the present invention, the peak foaming temperature in the foaming furnace is at least 600° C., at least 625° C., at least 650° C., at least 675° C., or at least 700° C. In some embodiments, peak foaming temperature in the foaming furnace is at most 950° C., at most 925° C., at most 900° C., at most 875° C., at most 850° C., at most 825° C., at most 800° C. In some embodiments, the peak foaming temperature in the foaming furnace is in the range of 600° C. to 1000° C. In more particular embodiments, the peak foaming temperature in the foaming furnace is in the range of 700° C. to 850° C.

The applicants have found that the compliance of the peak temperature in the foaming furnace with the lower limit as specified, the better and faster the sintering step occurs following the entry of the dry mixture of step a) into the foaming furnace. The applicants have further found that the compliance of the peak temperature in the foaming furnace with the upper limit as specified, the lower the risk of premature foaming reaction, i.e. foaming before the foaming agent particle has been embedded in a sintered matrix of glass material.

Glass Particle Size Reduction Step

In an embodiment of the present invention, the process comprises a glass particle size reduction step wherein the particle size of particles in the glass powder particles is reduced. The glass particle reduction step may include milling of the glass powder particles to reduce the glass particle size and/or a particle size classifier to select the desired particle size. The glass particle size reduction step may be performed before, during or after the glass powder is contacted with a foaming agent powder to form the dry mixture of step a).

In an embodiment of the process according to the present invention, the glass particle size reduction step makes use of at least one ball mill. The applicants have found that a ball mill is very suitable for reducing the average particle size of the glass powder. In another embodiment of the process according to the present invention, the glass particle size reduction step makes use of a grinding system composed of one ball mill and an air classifier.

In a particular embodiment, the process of the invention includes a glass particle size reduction step during or as part of the step of contacting the glass powder with the foaming agent powder to form a dry mixture of step a). In these embodiments, a ball mill may be used in the glass particle size reduction step and in the step of contacting the glass powder with the foaming agent powder to form a dry mixture of step a). The applicants have found that the ball mill may serve at the same time for contacting the glass powder with the foaming agent powder and for distributing the foaming agent powder over the surface of the glass powder. A ball mill may therefore simultaneously serve the three purposes: contacting the glass powder with the foaming agent powder, distributing the foaming agent particles over the surface of the glass powder particles, and reducing the size of the glass powder particles.

Cellular Glass Product

In a second aspect, the present invention provides a cellular glass product produced by the process as described above. The cellular product may have particularly good mechanical properties for its density. The cellular glass product of the second aspect may have a density D of at most 200 kg/m$^3$.

Density of the Cellular Glass Product

All densities are measured at ambient temperature and expressed in kg/m$^3$, unless specified otherwise. The densities of the cellular glass products of the present invention may be in the range of 70 to 200 kg/m$^3$.

In the third aspect, the present invention provides a cellular glass product having a density of 90 kg/m$^3$ or less. In some embodiments, the cellular glass product of the third aspect has a density in the range of 70 kg/m$^3$ to 90 kg/m$^3$. In some embodiments, the density D of the cellular glass product of the third aspect is at least 71 kg/m$^3$, at least 72 kg/m$^3$, at least 73 kg/m$^3$, at least 74 kg/m$^3$, at least 75 kg/m$^3$, at least 76 kg/m$^3$, at least 77 kg/m$^3$, at least 78 kg/m$^3$, at least 79 kg/m$^3$, or at least 80 kg/m$^3$. In particular embodiments the density D of the cellular glass product of the third aspect is at most 89 kg/m$^3$, at most 88 kg/m$^3$, at most 87 kg/m$^3$, at most 86 kg/m$^3$, at most 85 kg/m$^3$, at most 85 kg/m$^3$, at most 84 kg/m$^3$, at most 83 kg/m$^3$, at most 82 kg/m$^3$, at most 81 kg/m$^3$, or at most 80 kg/m$^3$.

In the fourth aspect, the cellular glass product has a density D of at most 200 kg/m$^3$. In particular embodiments, the cellular glass product of the fourth aspect has a density in the range of 70 kg/m$^3$ to 200 kg/m$^3$. In further particular embodiments, the cellular glass product of the fourth aspect has a density in the range of 70 kg/m$^3$ to 150 kg/m$^3$. In yet further particular embodiments, the cellular glass product of the fourth aspect has a density in the range of 70 kg/m$^3$ to 130 kg/m$^3$.

In an embodiment of the fourth aspect, the cellular glass product has a density D of at most 190.0 kg/m$^3$, at most 180.0 kg/m$^3$, at most 170.0 kg/m$^3$, at most 160.0 kg/m$^3$, at most 150.0 kg/m$^3$, at most 140.0 kg/m$^3$, at most 130.0 kg/m$^3$, at most 120.0 kg/m$^3$, at most 115 kg/m$^3$, at most 110 kg/m$^3$, at most 105 kg/m$^3$, at most 100 kg/m$^3$, at most 95 kg/m$^3$, at most 90 kg/m$^3$, at most 95 kg/m$^3$, at most 90 kg/m$^3$, at most 85 kg/m$^3$, or at most 80 kg/m$^3$. In some embodiments, the cellular glass product of the fourth aspect has a density of at least 75 kg/m$^3$, at least 80 kg/m$^3$, at least 85 kg/m$^3$, at least 90 kg/m$^3$, at least 95 kg/m$^3$, at least 100 kg/m³, at least 105 kg/m³, at least 110 kg/m³. In particular embodiments of the cellular glass product according to the fourth aspect, the density D of the cellular glass product is at least 71 kg/m³, at least 72 kg/m³, at least 73 kg/m³, at least 74 kg/m³, at least 75 kg/m³, at least 76 kg/m³, at least 77 kg/m³, at least 78 kg/m³, at least 79 kg/m³, at least 80 kg/m³, at least 85 kg/m³, or at least 90 kg/m³.

Average Cell Diameter

The applicants determine the average cell diameter of a cellular glass product according to the following procedure.

From the product is taken a representative sample having 6 rectangular side surfaces, thus necessarily about perpendicular to each other, and with dimension of at least 0,10×0,10 m×(at least) 0.03 m, particularly by making as much as possible freshly sawed or cut surfaces. If possible, any border effects from during the production process are avoided. With fresh slabs from the production line, the sample is particularly taken by avoiding the 5 cm, more particularly the 10 cm of product that are closest to the sides of the slab, as well as avoiding the top and bottom 3 cm of the slab in the form that this is leaving the production line, i.e. before any cutting or sawing.

Cellular glass products are typically made by foaming up under heat a foamable mixture of glass material or precursor with a foaming agent that is spread out over a 2-dimensional bottom surface. The foaming step thus expands typically in one main direction, herein called "the height". From the sample is first determined, if it is not directly derivable from the starting product, which one of the three main axes of the sample, i.e. virtual lines perpendicular to the sample surfaces, is the closest to or represents the foaming height direction. The "top" and "bottom" surfaces of the sample are then the two parallel surfaces that are perpendicular to this "height" axis. The cells of the foamed product are about spherical when they are formed, ideally taking a tetrakaidecahedral form, i.e. a regular 3D shape delimited by 8 hexagons and 4 squares, each square being bordered by 4 hexagons having the same side length. When a sample surface would cut through such a cell, the cross-section would be about circular. Because the cellular glass product is cooled after the foaming step, the cells of the glass product are subject to a shrinking process, primarily caused by the gasses inside the cells becoming cooler while the cell wall material has not yet fully solidified. This shrinking is not uniform, the shrinking being the strongest along the smallest dimension, which is usually the height direction. The shrinking causes the cells to become smaller in volume, and the cell dimension in the height direction is shrinking the most.

The "top" and "bottom" surfaces are therefore those surfaces in which the cross-sections of the cells with the sample surface have best retained their "about" circular shape, because the surface offers a top or bottom view of the cells. In the "side" surfaces on the contrary, the cells are observed from the side, their cross sections with the sample surfaces have "flattened" in the "height" direction. The cell cross sections thus deviate from about circular, forming a shape with a longer axis being perpendicular to a shorter axis. The "top" and "bottom" surface of the sample, and thus the "height" direction may thus readily be determined by observation of the surfaces of the sample.

In particular, the inventors make this observation under a microscope, with an optical magnification of at least 20×. In such a microscopic view or picture, when in doubt, may be determined an average cell diameter in a first direction giving about the highest diameter, and the average cell diameter in a second direction which is perpendicular to the first direction. A ratio of the two average cell diameters may then be determined by dividing the smallest average cell diameter by the largest one. The surface for which this ratio is the closest to unity is thus either the top or the bottom surface, and the direction perpendicular to this surface is the closest to the "height" direction of the sample.

In the context of the present invention, the average cell diameter $d_c$ of a sample of cellular glass material should be determined as viewed along the height axis, i.e. the view which provides a top or bottom view of the cells. The average cell diameter "$d_c$" should be determined by counting how often a section of a straight line of at least 3.0 cm long crosses a cell wall on a microscope picture. If the microscope picture is not large enough to host a 3.0 cm line section, several microscope pictures may need to be stitched to each other using appropriate software in order to obtain a microscopic picture representing a cellular glass sample of at least 3.0 cm long. The average cell diameter is then computed using formula (V):

$$d_c = L/((0.785)^2 * N) \quad (V)$$

wherein $d_c$ is the average cell diameter (in mm, with 10 micrometer significance or better)

L is the length of the line section crossing the cell walls in the microscope picture (expressed in mm, but measured to an accuracy of 10 micrometer or better), and N is the number of times the line section intersects cell walls along its length L. In the context of the present invention, this number should be at least 40, else a longer line needs to be selected, or additional measurements (additional lines whose intersections are counted) need to be performed on another part of the sample that has no cells in common with the first line(s).

The factor 0.785 is computed as the rounded result of π/4, conform what is described in Appendix X1 of ASTM D3576-15, i.e. the relation between the average chord length and the average cell diameter.

In the context of the present invention, a cell wall is defined as the material boundary separating two cells. There may however be bubbles present in a cell wall. If a line crosses a bubble, the cell wall surrounding the bubble should be counted as one cell wall, not two. A cell is therefore defined in the context of the present invention as a void having more than 3 neighbours. A cell usually has a non-spherical geometry, because "corners" are formed where three cells meet each other. Ideally the shape of a cell is a tetrakaidecahedron, or related. A bubble has only 3 or less neighbours and is typically almost fully spherical or ellipsoid in shape, usually having no "corners".

In particular, this measurement is repeated at least once, more particularly at least twice, even more particularly at least three times, yet more particularly at least 5 times on the same surface of the sample, the line sections being drawn at different locations on the sample surface, at least 2*d (with d as defined in formula I) apart from each other. The inventors typically work with a sample with the dimensions as described above of 10×10× at least 3 cm, whereby the two 10×10 cm surfaces are the top and the bottom surfaces of the product. The inventors typically divide the sample surface used for the cell diameter determination into 9 areas of about the same size by drawing a rectangular raster on the surface which divides each surface border in 3 parts of about the same size. The single central area is then labelled A, the 4 side areas bordering the area A are labelled B, and the 4 remaining corner areas are labelled C. The inventors typically draw one line section having the length L in each of the 9 areas. The inventors typically use all 9 measurements. For simplicity, the measurements for areas A and B may be used, or if sufficiently differentiating the result for area A only, but the inventors consider the combination of the 9 measurements as the ultimately governing result. The individual results di of each of the n individual measurements should then be averaged mathematically over all n measurements, in order to obtain the average cell diameter d for the sample.

When relating d to foam density D, as in the FIGURE, the density should be measured on the same samples on which d was measured, and should be averaged in the same way over multiple samples as was done for d.

The foam density D is calculated by measuring the weight of the sample with 0.1 g accuracy, and the linear dimensions with <1% relative accuracy. The linear dimensions allow to compute the volume, and foam density may be calculated by dividing the weight by the computed volume.

In an embodiment of the cellular glass product of the third aspect, the cellular glass product has an average cell diameter $d_c$ of at most 2.5 mm, at most 2.4 mm, at most 2.3 mm, at most 2.2 mm, at most 2.1 mm, at most 2.0 mm, at most 1.9 mm, at most 1.8 mm, at most 1.7 mm, at most 1.6 mm, at most 1.5 mm, at most 1.4 mm. In another embodiment, cellular glass product has an average cell diameter $d_c$ of at least 0.5 mm, at least 0.6 mm, at least 0.7 mm, at least 0.8 mm, at least 0.9 mm, at least 1.0 mm, or at least 1.1 mm. In particular embodiments, the cellular glass product of the third aspect has an average cell diameter $d_c$ in the range of 0.5 mm to 2.5 mm.

The applicants have found that compliance with the upper limit as specified brings the advantage of improved mechanical properties of the final product for the same thermal insulation properties. The applicants have also found that compliance with the lower limit as specified brings the advantage of improved thermal insulation properties for similar mechanical properties.

Additionally or alternatively, the cellular glass product of the third aspect may have an average cell diameter, $d_c$, that is at most 97% of the reference cell diameter as calculated in the fourth aspect, namely $$d = \frac{C_a}{\sqrt[3]{\frac{1}{1-\frac{D}{B}} - (1+C_b)}}$$

wherein:
d is the reference average cell diameter, expressed in meters (m),
D is the density of the cellular glass product, expressed in kg/m³, at ambient temperature,
B is the density of the bulk solid glass material forming the cell walls of the cellular glass product, expressed in kg/m³, at ambient temperature
$C_a = 5.96 \times 10^{-6}$, and
$C_b = 9.51 \times 10^{-3}$.

In an embodiment of the cellular glass product of the third aspect, the average cell diameter $d_c$ is at most 96% of d, at most 95% of d, at most 94% of d, at most 93% of d, at most 92% of d, at most 91% of d, at most 90% of d, at most 89% of d, at most 88% of d, at most 87% of d, at most 86% of d, at most 85% of d, at most 84% of d, at most 83% of d, at most 82% of d, at most 81% of d, at most 80% of d, at most 79% of d, at most 78% of d, at most 75% of d, at most 73% of d, or at most 70% of d.

The applicants have found that the lower this value, the better the combination may be of thermal insulation properties and mechanical properties of the final product, i.e. the better the desired technical effect of the present invention.

The cellular glass product of the fourth aspect has an average cell diameter, $d_c$, of at most 97% the reference cell diameter, d, provided that when the cellular glass product has a density D in the range of 95 to 105 kg/m³, the average cell diameter, $d_c$, of at most 90% the reference cell diameter, d.

In an embodiment of the cellular glass product of the fourth aspect where the cellular glass product has a density outside of the range of 95 to 105 kg/m³, the average cell diameter $d_c$ is at most 96% of d, at most 95% of d, at most 94% of d, at most 93% of d, at most 92% of d, at most 91% of d, at most 90% of d, at most 89% of d, at most 88% of d, at most 87% of d, at most 86% of d, at most 85% of d, at most 84% of d, at most 83% of d, at most 82% of d, at most 81% of d, at most 80% of d, at most 79% of d, at most 78% of d, at most 75% of d, at most 73% of d, or at most 70% of d.

In an embodiment of the cellular glass product of the fourth aspect where density of the cellular glass product is in range of 95 to 105 kg/m³, the average cell diameter $d_c$ is at most 89% of d, at most 88% of d, at most 87% of d, at most 86% of d, at most 85% of d, at most 84% of d, at most 83% of d, at most 82% of d, at most 81% of d, at most 80% of d, at most 79% of d, at most 78% of d, at most 75% of d, at most 73% of d, or at most 70% of d. The applicants have found that the lower this value, the better the combination may be of thermal insulation properties and mechanical properties of the final product, i.e. the better the desired technical effect of the present invention.

In an embodiment of the cellular glass product of the fourth aspect, the average cell diameter $d_c$ is at most 2.0 mm, at most 1.9 mm, 1.8 mm, 1.7 mm, 1.6 mm, 1.5 mm, 1.4 mm, 1.3 mm, 1.2 mm, 1.1 mm or 1.0 mm, or more particularly at most 0.90 mm, 0.80 mm, 0.70 mm, 0.60 mm, 0.50 mm, 0.40 mm, 0.30 mm, 0.20 mm, 0.10 mm or 0.05 mm. The applicants have found that compliance with the upper limit as specified brings the advantage of improved mechanical properties of the final product.

In a particular embodiment of cellular glass product of the third and fourth aspects, the average cell diameter $d_c$ is at most 2.0 mm.

Mechanical Properties of the Cellular Glass Product

The cellular glass product of the second, third and fourth aspects may possess certain mechanical properties to enable the cellular glass product to be useful, for example, as thermal insulation product. The following mechanical properties apply equally and independently for each of the second, third and fourth aspects.

In some embodiments, the cellular glass product shows a deformation under a point load of 1000 N, $P_d$, of at most 2.0 mm as determined in accordance with European Standard EN 12430. In particular embodiments, the cellular glass product shows a deformation under a point load of 1000 N, $P_d$, of at most 1.5 mm as determined in accordance with European Standard EN 12430. In further embodiments, the cellular glass product shows a deformation under a point load of 1000 N, $P_d$, of at most 1.0 mm as determined in accordance with European Standard EN 12430. In yet further embodiments, the cellular glass product shows a deformation under a point load of 1000 N, $P_d$, of at most 0.5 mm as determined in accordance with European Standard EN 12430.

In some embodiments, the cellular glass product has a compressive strength of at least 400 kPa (0.4 N/mm²). In a particular embodiments, the cellular glass product has a compressive strength of at least 500 kPa (0.5 N/mm²), at least 600 kPa (0.6 N/mm²), at least 700 kPa (0.7 N/mm²), at least 800 kPa (0.8 N/mm²), at least 900 kPa (0.9 N/mm²), at least 1000 kPa (1.0 N/mm²), at least 1100 kPa (1.1 N/mm²), at least 1200 kPa (1.2 N/mm²), at least 1300 kPa (1.3 N/mm²), or at least 1400 kPa (1.4 N/mm²).

In particular embodiments, the cellular glass product has a compressive strength of at least 500 kPa (0.5 N/mm²) and shows a deformation under a point load of 1000 N, $P_d$, of at most 1.5 mm as determined in accordance with European Standard EN 12430.

Compressive strength of the cellular glass product is measured in accordance with European Standard 826:1996, Annex A as set out on page 14 of European Standard EN 13167 titled "Thermal insulation products for buildings—Factory made cellular glass (CG) products—Specification" and page 15 of European Standard EN 14305:2009+A1: 2013 titled "Thermal insulation products for building equipment and industrial installations—Factory made cellular glass (CG) products—Specification".

PARTICULAR CELLULAR GLASS PRODUCT EMBODIMENTS

In a particular embodiment, the present invention provides a cellular glass product with a density D in the range of 70 kg/m³ to 90 kg/m³ with a compressive strength of at least 500 kPa (0.5 N/mm²).

In another particular embodiment, the present invention provides a cellular glass product with a density D in the range of 70 kg/m³ to 90 kg/m³ and the product shows a deformation under a point load of 1000 N, $P_d$, of at most 1.5 mm as determined in accordance with European Standard EN 12430.

In a further particular embodiment, the present invention provides a cellular glass product with a density D in the range of 70 kg/m³ to 90 kg/m³ and an average cell diameter $d_c$ of at most 2.5 mm.

In yet a further particular embodiment, the present invention provides a cellular glass product with a density D in the range of 70 kg/m³ to 90 kg/m³ and an average cell diameter, $d_c$ that is at most 97% of the reference cell diameter whereby $$d = \frac{C_a}{\sqrt[3]{\frac{1}{1-\frac{D}{B}} - (1+C_b)}}$$

wherein:
- d is the reference average cell diameter, expressed in meters (m),
- D is the density of the cellular glass product, expressed in kg/m³, at ambient temperature,
- B is the density of the bulk solid glass material forming the cell walls of the cellular glass product, expressed in kg/m, at ambient temperature
- $C_a = 5.96 \times 10^{-6}$, and
- $C_b = 9.51 \times 10^{-3}$.

In a particular embodiment of the third and fourth aspects, the present invention provides a cellular glass product having a density of at most 200 kg/m³ and an average cell diameter, $d_c$, that is at most 97% of the reference cell diameter whereby $$d = \frac{C_a}{\sqrt[3]{\frac{1}{1-\frac{D}{B}} - (1+C_b)}}$$

wherein:
- d is the reference average cell diameter, expressed in meters (m),
- D is the density of the cellular glass product, expressed in kg/m³, at ambient temperature,
- B is the density of the bulk solid glass material forming the cell walls of the cellular glass product, expressed in kg/m³, at ambient temperature
- $C_a = 5.96 \times 10^{-6}$, and
- $C_b = 9.51 \times 10^{-3}$ provided that when the density D is in the range of 95 to 105 kg/m³, the average cell diameter $d_c$ is at most 90% of d.

In another particular embodiment of the third and fourth aspects, the present invention provides a cellular glass product having a density of at most 200 kg/m³ and shows a deformation under a point load of 1000 N, $P_d$, of at most 1.5 mm as determined in accordance with European Standard EN 12430, provided that when the cellular glass product has a density D in the range of 90 kg/m³ to less than 95 kg/m³ or more than 105 kg/m³ to 200 kg/m³, the cellular glass product has an average cell diameter, $d_c$, that is at most 97% of the reference cell diameter, d, and provided that when the cellular glass product has a density D in the range of 95 kg/m³ to 105 kg/m³, the cellular glass product average cell diameter $d_c$ is at most 90% of d; whereby $$d = \frac{C_a}{\sqrt[3]{\frac{1}{1-\frac{D}{B}} - (1+C_b)}}$$

wherein:
- d is the reference average cell diameter, expressed in meters (m),
- D is the density of the cellular glass product, expressed in kg/m³, at ambient temperature,
- B is the density of the bulk solid glass material forming the cell walls of the cellular glass product, expressed in kg/m³, at ambient temperature
- $C_a = 5.96 \times 10^{-6}$, and
- $C_b = 9.51 \times 10^{-3}$.

In yet a further particular embodiment of the third and fourth aspects, the present invention provides a cellular glass product having a density of at most 200 kg/m³ and has a compressive strength of at least 400 kPa (0.4 N/mm²), provided that when the cellular glass product has a density D in the range of 90 to less than 95 kg/m³ or more than 105 to 200 kg/m³, the cellular glass product has an average cell diameter, $d_c$, that is at most 97% of the reference cell diameter, d, and provided that when the cellular glass product has a density D in the range of 95 to 105 kg/m³, the cellular glass product average cell diameter $d_c$ is at most 90% of d; whereby $$d = \frac{C_a}{\sqrt[3]{\frac{1}{1-\frac{D}{B}} - (1 + C_b)}}$$

wherein:
  d is the reference average cell diameter, expressed in meters (m),
  D is the density of the cellular glass product, expressed in kg/m³, at ambient temperature,
  B is the density of the bulk solid glass material forming the cell walls of the cellular glass product, expressed in kg/m³, at ambient temperature
  $C_a = 5.96 \times 10^{-6}$, and
  $C_b = 9.51 \times 10^{-3}$.

In this embodiment, the cellular glass product may also show a deformation under a point load of 1000 N, $P_d$, of at most 1.5 mm as determined in accordance with European Standard EN 12430. In this embodiment, the average cell diameter may be at most 2.0 mm.

In these particular embodiments of the cellular glass product, the cellular glass product may have a density D of at most 130 kg/m³.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

Moreover, the terms top, bottom, over, under and the like in the description and the claims are used for descriptive purposes and not necessarily for describing relative positions. The terms so used are interchangeable under appropriate circumstances and the embodiments of the invention described herein may operate in other orientations than described or illustrated herein.

EXAMPLES

Silicate glass powder and carbon black are mixed to form a mixture of silicate glass and carbon black powder. The silicate glass powder has a bulk density of 2515 kg/m³ and is provided in an amount required to produce a cellular glass product of density of 94 kg/m³.

The carbon black powder is provided in an amount to provide at least 150% of the theoretical minimum required carbon to produce a cellular glass of density 94 kg/m³. The silicate glass powder contains enough free oxygen in the form of $SO_4^{2-}$ to also be provided in an amount to provide at least 150% of the theoretical minimum of oxygen to produce a cellular glass of density 94 kg/m³.

The dry mixture of silicate glass and carbon black powder is treated at a maximum foaming temperature of around 800° C. in a foaming furnace to form cellular glass. The cellular glass is further annealed in an annealing lehr by cooling the cellular glass. The resulting cellular glass has a density of around 94 kg/m³. The average cell diameter may be in the region of 1.4 mm.

REFERENCES

A number of publications are cited above in order to more fully describe and disclose the invention and the state of the art to which the invention pertains. Full citations for these references are provided below. The entirety of each of these references is incorporated herein.
  ASTM C-162
  US 2005/0031844 A1
  WO 2009/141456 A1
  ASTM D6556—14
  ASTM D3576-15
  European Standard EN 12430
  European Standard EN 13167
  European Standard EN 14305:2009+A1:2013

The invention claimed is:
1. A cellular glass product having a density, D, in the range of 70 kg/m³ to 110 kg/m³, provided that when the cellular glass product has a density, D, in the range of 70 kg/m³ to less than 95 kg/m³ or more than 105 kg/m³, the cellular glass product has an average cell diameter, $d_c$, that is at most 97% of d, and provided that when the cellular glass product has a density, D, in the range of 95 kg/m³ to 105 kg/m³, the cellular glass product average cell diameter, $d_c$, is at most 90% of d; whereby

$$d = \frac{C_a}{\sqrt[3]{\frac{1}{1-\frac{D}{B}} - (1 + C_b)}}$$

wherein:
  d is the reference average cell diameter, expressed in meters (m),

D is the density of the cellular glass product, expressed in kg/m³, at ambient temperature, B is the density of the bulk solid glass material forming the cell walls of the cellular glass product, expressed in kg/m³, at ambient temperature $C_a = 5.96 \times 10^{-6}$, and
$C_b = 9.51 \times 10^{-3}$.

2. The cellular glass product according to claim 1, wherein the cellular glass product has a density, D, of 70 kg/m³ to 90 kg/m³ and the cellular glass product has an average cell diameter, $d_c$, of at most 97% of d.

3. The cellular glass product according to claim 1, wherein the cellular glass product has a density D, of 70 kg/m³ to 90 kg/m³ and the cellular glass product has an average cell diameter, $d_c$, of at most 2.5 mm.

4. The cellular glass product according to claim 1, wherein the cellular glass product has an average cell diameter, $d_c$, of at most 2.0 mm.

5. The cellular glass product according to claim 1, wherein the cellular glass product meets at least one of the following criteria:
   a. has a compressive strength of at least 400 kPa (0.4 N/mm²); and
   b. shows a deformation under a point load of 1000 N, $P_d$, of at most 2.0 mm as determined in accordance with European Standard EN 12430.

6. The cellular glass product according to claim 1, wherein the cellular glass product has a compressive strength of at least 500 kPa (0.5 N/mm²) and shows a deformation under a point load of 1000 N, $P_d$, of at most 1.5 mm as determined in accordance with European Standard EN 12430.

\* \* \* \* \*